United States Patent [19]

Allen et al.

[11] 4,280,407
[45] Jul. 28, 1981

[54] EXPLOSIVE PACKAGE ASSEMBLY

[75] Inventors: John R. Allen, Dollard Des Ormeaux; Louis-Georges Desrochers, Beloeil; Alain Loyer, Otterburn Park, all of Canada

[73] Assignee: C-I-L Inc., Montreal, Canada

[21] Appl. No.: 40,776

[22] Filed: May 21, 1979

[51] Int. Cl.³ .............................................. F42B 1/02
[52] U.S. Cl. ...................................... 102/320; 89/1 B; 228/2.5
[58] Field of Search ........... 102/24 R, 24 HC, 56 SC, 102/49.5; 89/1 B

[56] References Cited

U.S. PATENT DOCUMENTS

| | | | |
|---|---|---|---|
| 2,499,440 | 3/1950 | Wood | 102/24 R |
| 2,535,196 | 12/1950 | Counterman | 102/24 R |
| 2,558,163 | 6/1951 | Wright et al. | 102/24 R |
| 3,327,630 | 6/1967 | Bell | 102/24 HC |
| 3,404,649 | 10/1968 | Valihora | 102/49.5 |
| 3,486,410 | 12/1969 | Drexelius et al. | 89/1 B |
| 3,543,370 | 12/1970 | Berman et al. | 102/24 R X |
| 3,613,581 | 10/1971 | Pearson et al. | 102/24 R |
| 3,716,010 | 2/1973 | Wilson et al. | 102/49.5 X |
| 4,106,411 | 8/1978 | Borcher et al. | 102/24 HC X |

Primary Examiner—Peter A. Nelson
Attorney, Agent, or Firm—Donald G. Ballantyne

[57] ABSTRACT

An explosive package is provided which is particularly adapted to be placed against and around the inside and outside curvature of a metal pipe for explosive welding purposes. The package is a substantially flat trapezoidal-shaped container, the shorter, non-parallel ends of which can be adjustably abutted against the non-parallel ends of a similar package in order to provide a continuous ring or band of explosives inside or outside the circumference of a pipe.

6 Claims, 5 Drawing Figures

U.S. Patent  Jul. 28, 1981  4,280,407
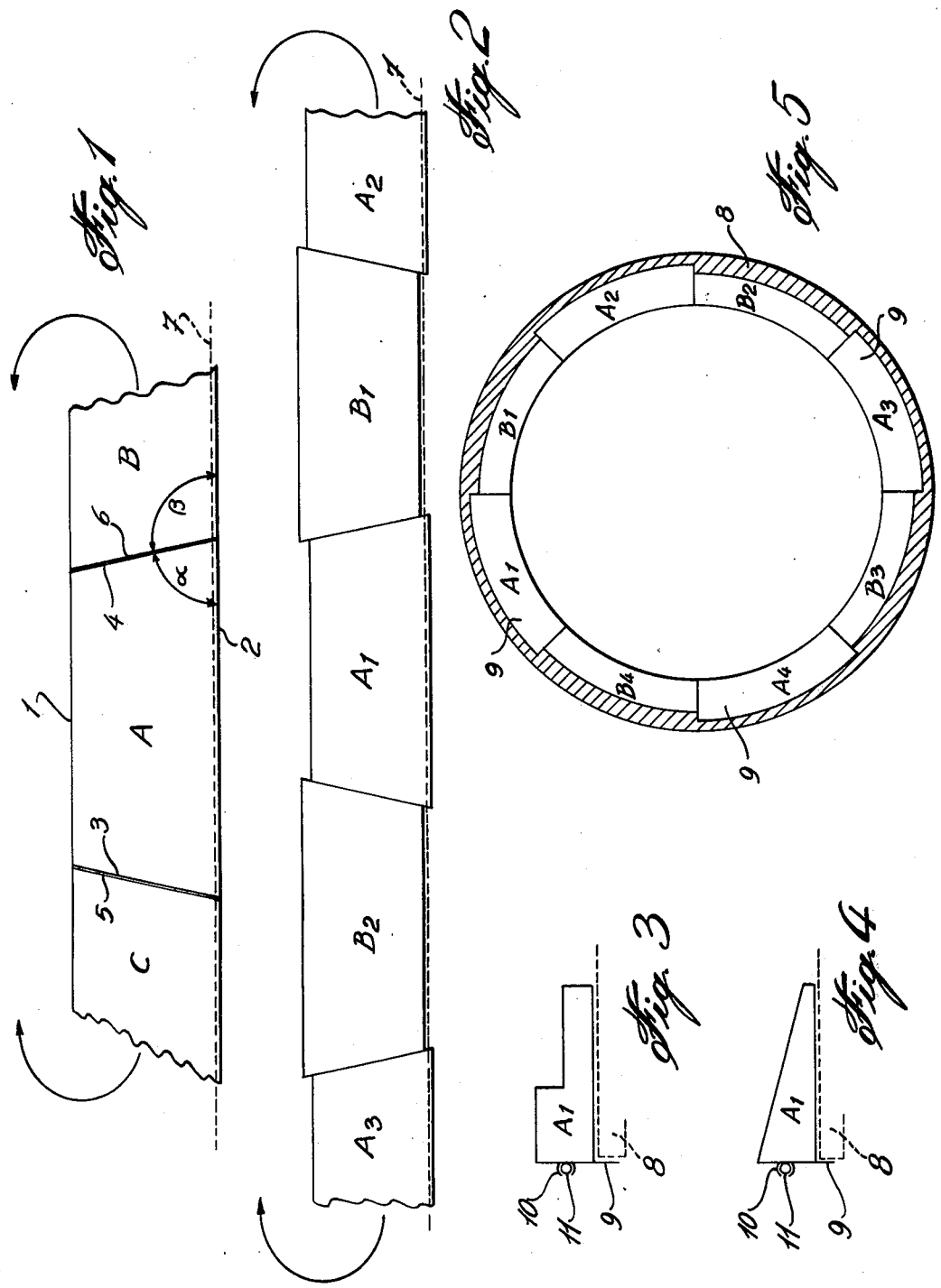

EXPLOSIVE PACKAGE ASSEMBLY

This invention relates to an explosive package assembly of the kind used in the explosive welding of metal, especially large diameter metal pipe sections. In particular, the invention is concerned with providing an assembly of uniform explosive packages which may be positioned as a train against and around the circumference of a large diameter pipe in such a way that the length of the train of packages is exactly equal to the circumferential distance around the pipe.

In copending United States application No. 40,515, now U.S. Pat. No. 4,231,506, there is disclosed a method of joining together sections of large diameter pipe by means of explosive welding. In the method described, male and female telescoping end portions of pipe sections are assembled in overlapping fashion and thereafter band-shaped explosive charges are superimposed inside and outside the overlapped pipe area. The charges are then simultaneously detonated against the pipes, the energy from the detonations causing the overlapping pipe areas to fuse together into a metallurgical bond. It is an essential feature of the method that both the inside and outside band explosive charges be continuous and gap-free around or within the circumference of pipe, that the charges be in close contact with the wall of the pipe and that the charges be positioned inside and outside the overlapped pipe areas in such a way that they are substantially superimposed upon one another both laterally and longitudinally. Unless these requirements are met, imperfect or ineffective joints and pipe wall damage can occur.

Because of a normal manufacturing variation found in the circumference of large diameter steel pipe and because of the expansion/contraction of the pipe which occurs between winter and summer conditions, difficulties have arisen in providing a convenient, tight fitting explosive package for the above-described pipe welding purposes. Generally, an elongated hollow flexible rectangular tube containing the explosive charge has been suggested as the explosive package for pipe welding applications. Such packages are made in a length corresponding to the largest expected circumference of the pipe and thereafter trimmed to size in the field at the time the charge is placed on or in the pipe. Whereas the use of such trimmable packages has been moderately successful for the outside charge, the use of these for the inside charge has proven to be generally unsatisfactory because of the difficulty of placement and adjustment against an inside pipe wall. Additionally the trimming and cutting of explosive packages in the field is undesirable from a safety viewpoint. It has now been found that intimate explosive contact with the pipe wall together with a continuous gap-free train of explosive material and simplicity in superimposition of the inside and outside pipe welding charges can be accomplished by utilizing a novel explosive package assembly as hereinafter described.

The novel explosive package assembly of the invention comprises at least two substantially flat, elongated abuttable containers each adapted to be placed in end-to-end contact and against the curvature of a pipe wall, each of the said packages having a wedge-shaped or stepped thick-to-thin cross-section and being characterized in having in its long dimension parallel sides of unequal length thus describing a container of trapezoidal configuration in plan, the said packages being adapted to fit together to form a substantially continuous straight-line assembly with the ends of each trapezoid in abutting contact.

The explosive package assembly of the invention may be more fully understood by reference to the accompanying drawing wherein, FIG. 1 is a view in plan of several explosive packages of the assembly in linear alignment which packages can be formed into a hollow cylinder or ring;

FIG. 2 is a plan view of an assembly of several explosive packages as in FIG. 1 except that the packages are in slightly offset linear alignment;

FIG. 3 is a cross-sectional view of an explosive package having a stepped configuration;

FIG. 4 is a cross-sectional view of an explosive package having a wedge-shaped configuration; and FIG. 5 is an end view of the packages of FIG. 1 or 2 formed into a hollow cylinder within the end of a length of pipe.

Referring to FIG. 1 there is shown a flexible explosive package A having long parallel sides 1 and 2 and shorter non-parallel ends 3 and 4, the package having the form of a trapezoid in plan.

Packages B and C of similar configuration to package A are shown with their shorter ends 5 and 6 in abutting contact with ends 3 and 4 of package A. The sum of the angle $\alpha$ of package A and the angle $\beta$ of package B comprise 180°. The arrows indicate that packages are formed in a ring or circular band and are adapted to be placed against and at the end of an inner pipe wall. Dashed line 7 indicates the leading edge of a pipe end or opening. The assembly as depicted in FIG. 1 represents the linear or straight-line alignment of packages A, B and C which alignment will occur when the total length of the package assembly is exactly equal, for example, to the inner circumference of the pipe in which the package train is placed.

Referring to FIG. 2 there is shown a train of flexible explosive packages A1, B1, A2, B2 and A3 in abutting end-to-end contact with each other. The arrows indicate that the packages are in the form of a ring or circular band and are adapted for contact fit against and at the end of a pipe wall, for example, an inner pipe wall. As in FIG. 1, dashed line 7 indicates the leading edge of a pipe end or opening. The assembly as depicted in FIG. 2 represents a slightly offset alignment of packages in the train which offsetting will be necessary to shorten the train in order to compensate for an internal pipe circumference slightly less that that of the maximum linear aligned length of packages A1, B1, A2, B2, A3, etc.

FIG. 3 shows one form of cross-sectional shape of any of the packages of FIG. 1 or 2 wherein the package and explosive charge are in the form of steps to provide a decreasing explosive mass in a direction away from the leading edge 8 of the pipe which is shown in dotted line. A projection or flap 9 may be provided at the thicker end of the package or of alternate packages which projection acts as a stopper and holds or positions the explosive charge exactly along the leading edge 8 of the pipe. A clip or other holding means 10 is adapted to secure an initiating means 11, such as a length of detonating cord, along and in contact with the thicker edge of the explosive package.

FIG. 4 shows an alternative wedge cross-sectional shape of any of the packages of FIG. 1 or 2, the thicker edge of the wedge being adapted to lie along the leading edge 8 of a pipe. Projection 9, holding means 10 and initiator 11 as described in FIG. 3 are also shown.

FIG. 5 shows the end view of a large diameter pipe 8 having a train of explosive packages A1, B1, A2, B2, A3, B3 and A4, B4 fitted to the inside circumference thereof. Packages A1, A2, A3 and A4 are each shown with a projection or flap 9 pressed against the edge of pipe 8. The packages B1, B2, B3 and B4 are wedged in position between the "A" packages to provide a tight fit around the circumference of pipe 8.

A typical 48 inch outside diameter steel pipe having a wall thickness of ¾ inch of the type often used in the construction of oil gas pipelines, has a nominal inside circumference at 20° C. of 146.27 inches which circumference may range from 146.17 inches to 146.57 inches because of normal manufacturing variations. The same pipe in arctic conditions, say −40° C., will have an inside circumference of 146.16 inches, while in tropical climates of about +40° C., the pipe will expand to an inner circumference of 146.31 inches. Thus for all conditions of temperature likely to be encountered in explosive pipeline welding of 48 inches diameter pipe, the explosive manufacturer will be required to provide an explosive package or series of packages which may be conveniently adjusted in the field to conform exactly to a range of circumferential lengths of from 146.06 to 146.61 inches. With the explosive package and assembly of the present invention, packages are provided so that when two, preferably several of the packages are abutted end-to-end in linear alignment and around the circumference of a pipe, a length is attained exactly equal to the maximum anticipated circumference. When slightly shorter pipe circumferences are encountered, the end-to-end train of packages may be offset in a linear arrangement, as shown in FIG. 2 of the drawing, in order to reduce the overall length of the train and so conform exactly to the pipe circumference.

The individual trapezoidal explosive packages of the assembly describe a flat, hollow box-like or bag-like structure containing a deformable welding explosive composition such as a particulate mixture of ammonium nitrate and TNT. Preferably the package is made of plastic film or metal foil or may comprise a blow-molded thin-walled plastic container. A suitable sealable aperture is provided preferably in one edge of the package for the filling therein of the explosive material.

In the field, a circular train of the flexible packages of the invention may be assembled on a holding jig or other support and thereafter placed as a unit into the open end of a male pipe. Once in position, the train of explosive package is tightened or relaxed against the pipe wall by manipulation of the packages so as to provide a continuous, substantially aligned series of packages in firm contact with each other and with the inner pipe wall. The jig can then be removed. After the connection of an appropriate initiation means, such as a length of detonating cord, the pipe end with its explosive package assembly is inserted into the female belled end of a second pipe section. An exterior train of explosive charge packages is then placed on the outer surface of the overlapped female pipe end so that the inner and outer explosive charges are superimposed. Alternatively the female pipe end may be preloaded with the package assembly before insertion of the male pipe end. After the connection of an initiation means to the outer charge, the two charges are simultaneously detonated to produce a metallurgical weld at the area of pipe overlap.

We claim:
1. A metal welding explosive charge in the form of a package adapted for placement against the inner curved surface of a hollow metal cylinder comprising:
 (a) a generally flexible, hollow, substantially flat, elongated, box-like container having in one dimension parallel side edges of unequal length and in a second dimension non-parallel side edges of equal length, the container thus describing a trapezoidal shape in plan with parallel side edges and non-parallel end edges, and
 (b) a deformable explosive composition contained therein, the said container being fittable in abutting end contact with a like container along a non-parallel side edge, the said abutted container forming a continuous, length-adjusted closed ring assembly of packages against a curved metal surface to be explosively welded.

2. An explosive package as claimed in claim 1 having a sealable filling aperture in one edge thereof.

3. An explosive package as claimed in claim 1 having a tapered or stepped thick-to-thin cross-section between its parallel side edges.

4. An explosive package as claimed in claim 3 having a projection along its thicker side edge, said projection being adapted to retain said package in line with the leading edge of a metal section against which the package is in contact.

5. An explosive package as claimed in claim 3 having means along its thicker side edge adapted to retain along and in contact with said side edge, a cord-like initiating means.

6. An explosive package as claimed in claim 1 wherein the material of the container is selected from the group consisting of plastic film, metal foil and blow-molded plastic.

* * * * *